(12) United States Patent
Lore

(10) Patent No.: US 11,455,646 B2
(45) Date of Patent: Sep. 27, 2022

(54) MACHINE-LEARNED ATTENDANCE PREDICTION FOR TICKET DISTRIBUTION

(71) Applicant: UpTix, Inc., Long Beach, CA (US)

(72) Inventor: Marc Eric Lore, New York, NY (US)

(73) Assignee: UPTIX, INC., Long Beach, CA (US)

(*) Notice: Subject to any disclaimer, the term of this patent is extended or adjusted under 35 U.S.C. 154(b) by 0 days.

(21) Appl. No.: 17/109,098

(22) Filed: Dec. 1, 2020

(65) Prior Publication Data
US 2022/0172237 A1 Jun. 2, 2022

(51) Int. Cl.
G06Q 30/00 (2012.01)
G06Q 10/00 (2012.01)
G06Q 30/02 (2012.01)
G06Q 10/02 (2012.01)
G06N 20/00 (2019.01)

(52) U.S. Cl.
CPC ......... *G06Q 30/0206* (2013.01); *G06N 20/00* (2019.01); *G06Q 10/02* (2013.01); *G06Q 30/0201* (2013.01); *G06Q 30/0205* (2013.01)

(58) Field of Classification Search
None
See application file for complete search history.

(56) References Cited

U.S. PATENT DOCUMENTS

| | | | |
|---|---|---|---|
| 10,366,373 B1 | 7/2019 | Denker et al. | |
| 10,650,331 B1* | 5/2020 | Mossoba | G07C 9/00309 |
| 2007/0055554 A1 | 3/2007 | Sussman et al. | |
| 2007/0124259 A1 | 5/2007 | Sussman et al. | |
| 2007/0162301 A1 | 7/2007 | Sussman et al. | |
| 2011/0208674 A1* | 8/2011 | Mills | G06Q 99/00 705/500 |

(Continued)

FOREIGN PATENT DOCUMENTS

WO WO-2019221737 A1 * 11/2019 ............. G06Q 10/02

OTHER PUBLICATIONS

International Search Report and Written Opinion, Patent Cooperation Treaty Application No. PCT/US2021/060936, dated Feb. 18, 2022, 17 pages.

(Continued)

*Primary Examiner* — Rutao Wu
*Assistant Examiner* — Matheus Ribeiro Stivaletti
(74) *Attorney, Agent, or Firm* — Fenwick & West LLP

(57) ABSTRACT

A ticket exchange server is configured to determine a number of tickets to distribute for an event. The ticket exchange server accesses, for a stadium, training data describing attendance at historical events, historical opponents of a sports team, and a historical win/loss record of the sports team. The ticket exchange server trains a machine-learned model configured to predict an attendance for a future event at the stadium based on an opponent of the sports team at the future event and a current or predicted win/loss record of the sports team. The ticket exchange server selects an event for the sports team against an opponent and determines a predicted attendance using the machine-learned model. The ticket exchange server identifies a number of tickets greater than a capacity of the stadium to make available based on the predicted attendance and distributes the number of tickets to prospective attendees.

20 Claims, 11 Drawing Sheets

(56) References Cited

U.S. PATENT DOCUMENTS

| | | | |
|---|---|---|---|
| 2013/0185103 A1* | 7/2013 | Sunshine | G06Q 30/0601 |
| | | | 705/5 |
| 2014/0344294 A1 | 11/2014 | Skeen et al. | |
| 2015/0012306 A1* | 1/2015 | Butterfield | G06Q 10/02 |
| | | | 705/5 |
| 2016/0042364 A1 | 2/2016 | Zamer et al. | |
| 2017/0372551 A1 | 12/2017 | Bruce et al. | |
| 2018/0025373 A1* | 1/2018 | Perri | G06Q 50/01 |
| | | | 705/7.11 |
| 2018/0322551 A1 | 11/2018 | Siegel et al. | |
| 2020/0272952 A1 | 8/2020 | Shealy et al. | |
| 2020/0380572 A1* | 12/2020 | Smith | G06Q 30/0283 |

OTHER PUBLICATIONS

Mukhopadhaya, S. et al., "An efficient auction based TATKAL scheme for Indian Railway," 2010 International Conference on Innovative Computing and Communication and 2010 Asia-Pacific Conference on Information Technology and Ocean Engineering, Jan. 30-31, 2010, pp. 153-157.

United States Office Action, U.S. Appl. No. 17/109,102, filed Mar. 2, 2022, 26 pages.

United States Office Action, U.S. Appl. No. 17/109,102, filed Jun. 3, 2022, 30 pages.

* cited by examiner

MACHINE-LEARNED ATTENDANCE PREDICTION FOR TICKET DISTRIBUTION

BACKGROUND

When an attendee purchases a ticket for a sporting event, the attendee typically purchases a ticket for themselves to use at the sporting event. The ticket may give the attendee access to general areas of the stadium, including food vendors and restrooms, and to a designated seat within a section of the stadium. During the sporting event, the attendee may move between the general areas and their designated seat as desired. However, even if seats closer to action within the stadium (e.g., a field or court) become available once other attendees leave the sporting event, the attendee may not be allowed to take the empty seats and may be constrained to their original designated seat. Further, the empty seats may still be considered "reserved" for the original attendees to use, even if they have permanently left the sporting event. Thus, this valuable space within the stadium may be left empty, rather than being used to allow more people to attend the sporting event.

In some instances, an entity, such as the attendee or another person near the sporting event, may distribute a new ticket for a vacated seat. Since the sporting event has already started, the new ticket may be valued less than it was originally purchased for. However, the entity may have difficulty determining a fair value for the new ticket. For instance, the new ticket may have more value if the sporting event has a close score versus if the sporting event is a "wipeout" (e.g., one team is winning easily). Accordingly, a system for determining the value of the ticket for the seat is needed.

Furthermore, the number of tickets distributed for a sporting event may reflect a capacity of a stadium the sporting event is held in. For example, if a baseball game is being held in a stadium that seats 40,000 people, 40,000 tickets or less may be distributed for the baseball game. However, even if all 40,000 tickets are distributed, the likelihood of 40,000 people attending the game with those tickets is low. More likely, less than 40,000 people will actually attend the baseball game since some ticket holders may change their plans last minute. Additionally, if the baseball game is a likely to be an exciting game between two rivals, then more ticket holders are likely to attend the baseball game than a baseball game that is projected to be slower paced. Hence, if not enough tickets are distributed for the stadium to be at capacity during the sporting event, potential attendees may have missed out on the opportunity to view the sporting event in-person due to lack of available tickets.

SUMMARY

The following disclosure describes a ticket exchange server that distributes tickets for seats at an event. In particular, the ticket exchange server controls a set of locked seats in the stadium based on presence of users within the stadium. The ticket exchange server receives requests for tickets to events within the stadium and distributes tickets to client devices based on requests. The ticket exchange server determines users' presences via the users' client devices. When a user comes within a vicinity of their seat at the event, the ticket exchange server unlocks the seat for the user. The user may sit in their seat to watch the event or move about the stadium, returning to the seat intermittently. If the user decides to leave the event early, they may surrender their seat (i.e., by indicating to the ticket exchange server that they are leaving the event and will not return), and the ticket exchange server may provide a ticket for the seat to a new user for the remainder of the event and unlock the seat of the new user after detecting a presence of the new user at the seat.

The ticket exchange server also determines a number of tickets to make available for an event at a stadium. In particular, the ticket exchange server uses a machine-learned model configured to predict attendance at the event. The machine-learned model may be trained on historical attendance data for historical events at the stadium, historical opponents of a sports team playing at the event, and/or a historical win/loss record for the sports team. The ticket exchange server uses the machine-learned model to predict an attendance for the event and uses the predicted attendance to identify and distribute a number of tickets more than the predicted attendance in an effort to maximize a number of tickets distributed for the event.

Furthermore, the ticket exchange server may distribute tickets for vacated seats at an event. In particular, the ticket exchange server uses a machine-learned model to predict an expected likelihood that a seat within a stadium will be vacant over the course of a future sporting event based on real-time statistics of the future sporting event. The ticket exchange server may train the machine-learned model to predict expected likelihoods based on historical attendance at historical sporting events in the stadium and historical sporting event statistics. The ticket exchange server detects a vacant seat at the stadium during a sporting event and applies the machine-learned model to real-time statistics of the sporting event to determine a value of a new ticket for the vacant seat. The ticket exchange server distributes the new ticket for the vacant seat for a remaining portion of the sporting event to an attendee of the sporting event.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
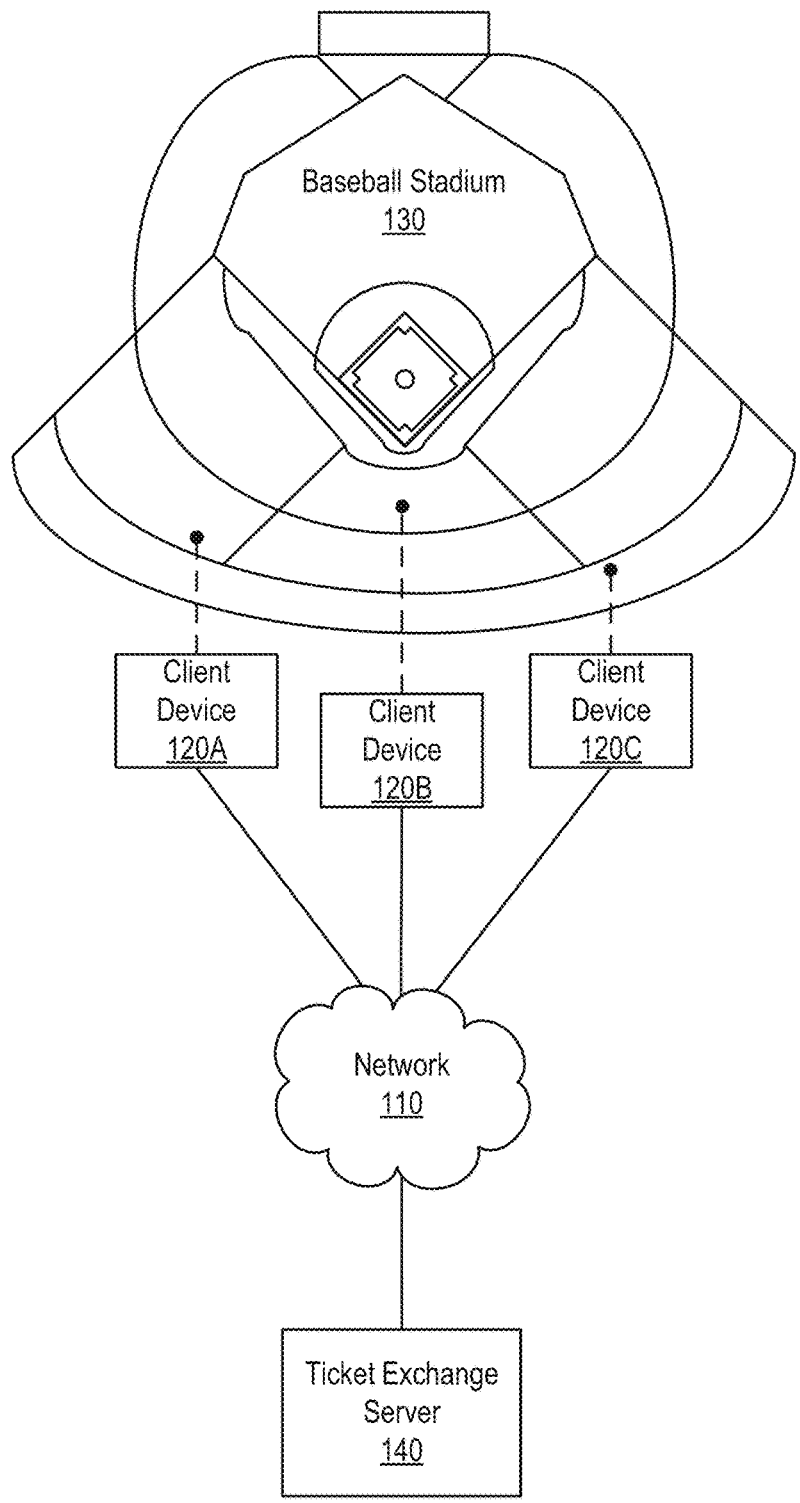
FIG. 1 illustrates a system environment for a ticket exchange server, according to one embodiment.

FIG. 1 illustrates a system environment 100 for a ticket exchange server 140, according to one embodiment. The ticker exchange system 140 is connected to a number of client devices 120 used by attendees at an event via a network 110. These various components are now described in additional detail.

The client devices 120 are computing devices such as smart phones, laptop computers, desktop computers, or any other device that can communicate with the ticket exchange server 140 via the network 110. The client devices 120 may provide a number of applications, which may require user authentication before a user can use the applications, and the client devices 120 may interact with the ticket exchange server 140 via an application. Though three client devices 120 are shown in FIG. 1, any number of client devices 120 may be connected to the ticket exchange server 140 in other embodiments. The client devices 120 may be located within a region designated for an event, like a baseball stadium 130. Other designated regions may include theaters, concert halls, courts, fields, and/or any other type of venue for events. For the sake of simplicity, description herein will be limited to stadiums 130, though in practice, the methods described herein apply equally to any other region or venue.

Furthermore, though the event at the stadium 130 may herein be referred to as a "sporting event" or "baseball game," the event may be related to other visual or auditory shows, conferences, or meetings. Examples of such events include football games, basketball games, tennis matches, golf tournaments, and/or another sporting event. Other examples of such events include movies, concerts, musicals, plays, academic conferences, talk shows, and the like.

Figure 2:
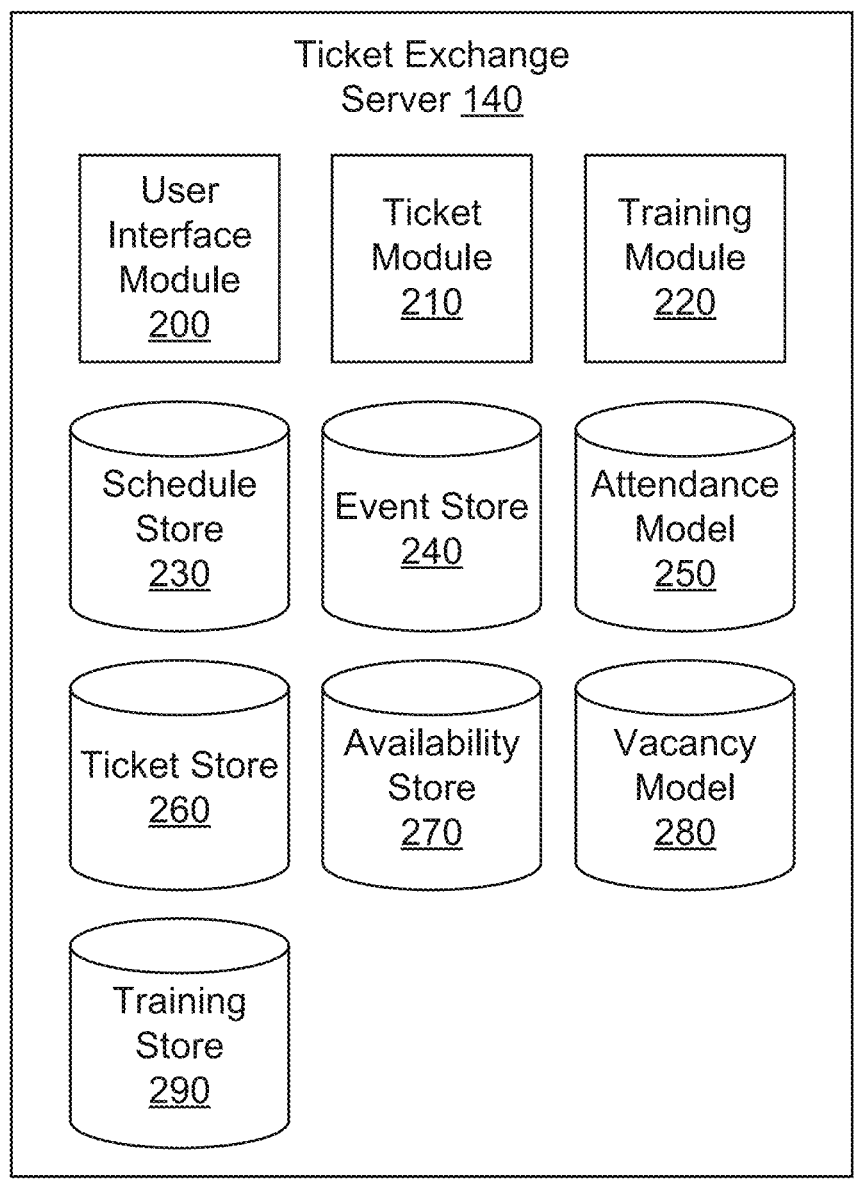
FIG. 2 is a high-level block diagram illustrating a detailed view of a ticket exchange server, according to one embodiment.

The network 110 connects the client devices 120 to the ticket exchange server 140, which is further described in relation to FIG. 2. The network 110 may be any suitable communications network for data transmission. In an embodiment such as that illustrated in FIG. 1, the network 110 uses standard communications technologies and/or protocols and can include the Internet. In another embodiment, the network 110 use custom and/or dedicated data communications technologies.

FIG. 2 is a high-level block diagram illustrating a detailed view of a ticket exchange server 140, according to one embodiment. The ticket exchange server 140 operates in real-time to offer tickets to sporting events, to monitor a use of each seat in a stadium 130 during a sporting event, and to predict attendance of future sporting events. The ticket exchange server 140 includes a user interface module 200, a ticket module 210, a training module 220, a schedule store 230, an event store 240, an attendance model 250, a ticket store 260, an availability store 270, a vacancy model 280, and a training store 290. In some embodiments, the ticket exchange server 140 may include more modules or models than shown in FIG. 2 or one or more of the modules and models shown in FIG. 2 may be combined within the ticket exchange server.

The user interface module 200 generates ordering interfaces for display on client devices 120. The user interface module 200 receives, from a client device 120, a request to view tickets for a sporting event, which may be scheduled to occur at a later time or date, which may be currently occurring. The user interface module 200 requests tickets for the sporting event from the ticket module 210. A ticket is an electronic or physical item that is used to grant a person access to the sporting event and may be associated with a designated seat or section within the stadium 130.

The user interface module 200 generates an ordering interface offering tickets for the sporting event and transmits the ordering interface for display via the client device 120. In some embodiments, instead of offering specific seats within the stadium, the ordering interface offers tickets within a section, and users who select tickets via the ordering interface are assigned seats in a selected section, either before or during the sporting event. In other embodiments, the ordering interface offers tickets for specific seats within the stadium 130. The ordering interface may include interactive elements which the user may interact with to receive information about the event or the stadium 130, or to purchase one or more tickets. The user interface module 200 facilitates purchases of tickets along with refunding deposits, offering incentives, and distributing rebates. In particular, the user interface module 200 may receive indications from the ticket module 210 if seats at an ongoing sporting event are increasing the value, and if so, the user interface module 200 may offer rebates to users who voluntarily surrender their seats and leave the ongoing sporting event so the user interface module 200 may offer the seats for sale at a higher value than the seats were initially sold for.

In some embodiments, the user interface module 200 may narrow the selection of tickets presented via the ordering interface based on user account information associated with the client device 120. For example, users may need a VIP account to access a VIP section of seats at the events, so if the user of the client device 120 does not have the VIP account, the user interface module 200 may not offer tickets for the VIP section in the ordering interface.

The user interface module 200 may also retrieve schedule information for the event from schedule store 230. The schedule information for the event includes a date of the event, an estimated time range of the event, and a location of the event (i.e., a stadium), and the user interface module 200 may display the schedule information to the ordering interface. The user interface module 200 may display the schedule information to the ordering interface for users to view as they browse tickets for the sporting event.

The user interface module 200 receives requests for tickets from client devices 120 via the ordering interface and facilitates purchases of the tickets via the ordering interface. For each purchased ticket, the user interface module 200 may indicate that the ticket was sold to the ticket module 210 and generate a ticket interface showing an electronic, scannable ticket for a seat at the sporting event. The ticket may be for a particular seat in the stadium or a section of the stadium, such that when the user arrives to the section for the event, they are assigned a seat within the section. The ticket interface may also include an interactive map of the stadium, event information retrieved from the event store 240, and one or more interactive elements that a user may interact with to indicate usage of their seat at the event. For example, while at the event, the user may display the ticket interface to a scanner system or teller to gain entrance to the event. Furthermore, the user may interact with the ticket interface to indicate that they are at their seat or that they would like to surrender their seat when they leave the sporting event before its conclusion.

The ticket module 210 identifies available tickets for sporting events. Upon receiving a request from the user interface module 200 for tickets to a sporting event, the ticket module 210 accesses a schedule store 230, which stores schedule information describing sporting events at one or more stadiums 130. For a given stadium 130, the schedule information may include a time and date of the event and entities at the event (i.e., teams playing each other, a speaker giving a talk, a singer performing, a movie playing, etc.). For the sporting event, the ticket module 210 may retrieve event information from the event store 240. Event information includes information describing a home team, an opponent team, a historical win/loss record of each team, and historical game statistics each team. The event store 240 may also store real-time statistics about sporting events, such as a score, playing statistics per player (e.g., batting or pitching statistics), team rank, player values, or any other game statistic describing the sporting event while the sporting event is occurring. These real-time statistics may be stored as event information for future sporting events once the sporting event is over.

For a future sporting event (e.g., those that are scheduled to occur at the stadium 130 at a future time), the ticket module 210 determines tickets for the future sporting event and sends the tickets to the user interface module 200 to be distributed via the ordering interface. In particular, the ticket module 210 may determine a number of tickets to distribute for the future sporting event responsive to a triggering event that indicates that tickets for the future sporting event should be distributed. For instance, the triggering event may be an indication from an administrator, received from the user interface module 200, indicating a time and date that tickets for the future sporting event should become available. In another instance, the triggering event may be reaching a threshold amount of time until the future sporting event is scheduled to occur (e.g., a baseball game will occur in 1 month). Further, the triggering event may be a request received via the ordering interface for a ticket to the future sporting event.

For the future sporting event, the ticket module 210 retrieves event information for the future sporting event from the event store 240 and inputs the event information into the attendance model 250. In some embodiments, the attendance model also takes calendar data including one or more of a day of the week of the future sporting event, a time of the sporting event, and a schedule of games for a sports team playing at the sporting event as input. The attendance model 250 is a machine-learned model trained by the training module 220 to predict attendance at an event. The attendance model 250 may be a neural network (such as a DNN or CNN), a classifier, a regression model, or any suitable machine-learned model. The attendance model 250 returns a predicted attendance for the future sporting event to the ticket module 210. The predicted attendance is a predicted amount of people who attend the sporting event. For example, the attendance model 250 may predict a higher attendance for a baseball game against a local rival team than a baseball game against a new baseball team from another geographic region. In some cases, the attendance model may return a predicted attendance for each section of the stadium 130.

Based on the predicted attendance of the future sporting event, the ticket module 210 determines a number of tickets to make available for the future sporting event. The number of tickets to make available may be greater than the capacity of the stadium 130 to optimize an amount of tickets sold based on the predicted attendance for the future sporting event. For example, if the predicted attendance is 36,000 attendees, which is 90% of the capacity of the stadium 130, the ticket module 210 may make 45,000 tickets available since the likely attendance is less than the capacity of the stadium. Increasing the number of available tickets to more than capacity may increase the number of attendees who actually attend the future sporting event. In another example, the ticket module 210 may determine a higher number of tickets to distribute for a sporting event with a first predicted attendance (e.g., 30,000 people) that is less than a second predicted attendance (e.g., 35,000 people) in an effort to increase the actual attendance at the sporting event by offering more tickets.

Furthermore, in some instances, the ticket module 210 may determine sections of the stadium 130 to increase available tickets for. In particular, each seat in the stadium 130 may be located in a particular section the stadium 130. Some sections of the stadium 130, like a section located in the front and center of the stadium 130, may be more desirable to attendees than other sections, like a section located in the upper decks or outfield of the stadium. The ticket module 210 may determine, based on historical ticket sales data, which sections of the stadium 130 are the most popular among attendees and make tickets for sections available based on the popularity of the sections. For example, for two sections of the stadium 210 with the same number of seats, the ticket module 210 may make more tickets available for the less popular of the two sections since attendees with tickets to the more popular section are more likely to attend the future sporting event.

The ticket module 210 stores the tickets for the future sporting event in ticket store 260. The ticket module 210 may store ticket information along with each ticket in the ticket store 260. Ticket information includes a section or seat in the stadium 130 associated with the ticket. The ticket module 210 sends the tickets to the user interface module 200 to offer for sale via the ordering interface. In some embodiments, the tickets may be sold for a standardized value based on a section of the stadium 130 or a type of sporting event (e.g., a pre-season game, a championship game, etc.). Alternatively, the ticket module 210 may input the tickets, ticket information, and/or event information to a machine-learned model configured to determine values of tickets. The ticket module 210 may store the determined values of the tickets as ticket information in the ticket store 260.

The ticket module 210 may send tickets to the user interface module 200 upon request, or the user interface module 200 may directly access the ticket store 260 to retrieve tickets and ticket information. Furthermore, as tickets are sold, the ticket module 210, upon receiving indications from the user interface module 200, updates the ticket store 260 to reflect that the sold tickets are no longer available for purchase and adds a name of a user associated with each purchased ticket to the ticket information. Alternatively, the user interface module 200 may directly update the ticket store 260 to reflect the ticket availability upon distributing one or more tickets via the ordering interface.

As a sporting event is occurring, the ticket module 210 assigns seats to users with tickets. To do so, the ticket module 210 monitors users' locations in real-time as they move about the stadium 130 to determine whether a user has reached a designated section or seat indicated by their ticket. In particular, the ticket module 210 receives location information from client devices 120 of users with tickets for the sporting event. The location information indicates a geographic location of a user received from the user's client device 120.

In embodiments where tickets for the sporting event indicate a designated section of the stadium 130, rather than a specific seat, the ticket module 210 assigns each user a designated seat responsive to determining the user is at the designated section in the stadium 130. In particular, when the ticket module 210 detects that a user is at the designated section indicated on their ticket, the ticket module accesses the availability store 270 to determine which seats in the designated section are available. The availability store 270 stores seating information including available (e.g., unassigned) and unavailable (e.g., assigned) seats within each section of the stadium 130. The ticket module 210 assigns the user the "best" seat available in the section, i.e., a seat not already assigned to another user that is closest to the front of the section (or another desirable portion of the section). The ticket module 210 updates seating information in the availability store 270 as seats are assigned to users such that the availability store 270 contains seating information reflecting real-time availability within the stadium 130.

Furthermore, if the user is part of a group, the ticket module assigns all users in the group seats once one user for the group is at the section. For a group of users, the ticket module 210 prioritizes assigning seats such that the group of users sits together during the sporting event. In particular, the ticket module 210 assigns seats located together within the section to the users in the group. For example, the ticket module 210 retrieves group data, which is stored with the ticket information, from the ticket store 260. The group data indicates which tickets are together in a group, which the ticket module 210 may determine based on the tickets being purchased from one client device 120 or through user account information linking the tickets together. The group data also indicates a plurality of client devices 120 each associated with a ticket in the group. For a group of tickets, the ticket module 210 assigns users with the tickets seats in the same row as one another or within a designated vicinity. The ticket module 210 may also assign single users to seats near groups, rather than random seats in the middle of the section, in order to maximize available seats for other groups for tickets for the section. It should be noted that when the ticket module 210 assigns a user the best available seat within a section, the ticket module 210 can consider groups of tickets within the section that have not yet been assigned seats. Accordingly, if there is only one group of 4 consecutive seats remaining in a section, and one group of 4 tickets that have not yet been assigned seats, if a different ticket holder arrives at the section, the ticket module 210 will assign the ticket holder a seat that is not within the group of 4 consecutive seats, even if the 4 consecutive seats represent the best remaining seats within the section. Thus, the ticket module 210 can preserve groups of seats for sections with groups of ticket holders that have not yet arrived at the stadium by not assigning the seats the ticket holders outside of the group.

In some embodiments, the ticket module 210 may automatically upgrade a user' when assigning a seat. For instance, if no seats are available in the designated section of the user's ticket, the ticket module 210 assigns the user a seat in a "better" section of the stadium 130. "Better" sections may have more expensive tickets, be closer to the field, be located behind home plate, or otherwise be considered more desirable than the designated section, for instance as indicated by historical ticket sales data. The same may be true for other events, like a basketball game, where the best seats are on the court, or a movie, where the best seats are in the back row. For a group of users, if the designated section of the user's tickets cannot accommodate one or more of the users (due to seats in the designated section already being assigned to other users), the ticket module 210 upgrades all of the users in the group to seats in a better section. If no seats are available in a better section, the ticket module 210 may partially upgrade the group, provide a rebate to one or more users of the group, or take another remedial action.

The ticket module 210 may monitor the attendance at a sporting event in the stadium 130 based on seating information in the availability store and location data describing client devices of users with tickets at the stadium 130. The ticket module 210 stores real-time attendance data for the event as event information in the event store 240. If the ticket module 210 determines, based on the monitored attendance at the sporting event, that more users than available seats have arrived at the sporting event, the ticket module 210 may send an indication to the user interface module 200 to offer incentives to users at the sporting event who have not yet been assigned seats to release (i.e., give up) their tickets. For instance, users who take an incentive may be provided with a full refund, a discount on future tickets, a cash rebate, and/or a ticket for a future sporting event at the stadium 130. The ticket module 210 may send a new indication to the user interface module 200 to stop offering incentives once the attendance at the sporting event no longer indicates there are more users with unassigned seats than available seats. The ticket module may also offer incentives for a specific user to surrender their seat responsive to detecting that their seat has a value over a threshold if vacated and resold.

The ticket module 210 continues to monitor users' locations after they have reached their designated sections, and once a user has reached their assigned seat in the stadium 130, the ticket module 210 unlocks their assigned seat. For instance, each seat in the stadium 130 includes a locking mechanism that communicates with the ticket exchange server 140. In some embodiments, the ticket exchange server 140 communicates with the seats in the stadium 130 via the network 110, either directly from the network 110 to the seats or through client devices 120 within the stadium 130. The ticket module 210 may communicate with the seats to unlock a seat in response to detecting a user's presence at the seat or in response to receiving an indication from the user's client device 120 that the user is at the seat. The ticket module 210 may determine the user's presence at the seat by receiving a GPS location from a client device 120 of the user indicating that the user is within a threshold distance of the seat. Likewise, the ticket module 210 may determine the user's presence at the seat by receiving, via the seat, a near-field signal from the client device 120 (such as an RFID signal). In some instances, the ticket module may also charge a user a deposit for their assigned seat upon unlocking their seat, which may be returned once they leave the sporting event. For instance, if a user purchases a ticket for the first 3 innings of a game, the user can pay a deposit which will be refunded if the user leaves the seat within a threshold amount of time after the end of the third inning.

The ticket module 210 also locks seats in the stadium 130. For instance, the ticket module 210 may lock all or a portion of the seats in the stadium 130 when the sporting event ends.

The ticket module may also lock a user's assigned seat in response to receiving an indication from the user, via their client device 120, that the user would like to surrender their assigned seat. Surrendering a seat indicates to the ticket module 210 that the user is leaving the sporting event and will not return before conclusion of the sporting event. If a user surrenders their seat, the ticket module 210 may update the seating information in the availability store 270 to indicate that the seat is no longer assigned to the user. In some instances, if the user responds to an offer made by the user interface module 200 to surrender the seat, the user may receive a rebate. Alternatively, the user may be charged a deposit when they are assigned the seat which is only returned if they surrender the seat, which incentivizes the user to surrender the seat rather than only leave the sporting event. The user may need to surrender their assigned seat within a threshold amount of time of being assigned the seat to receive the deposit back or may be charged an additional late fee if they do not surrender the seat within the threshold amount of time. In some embodiments, a user's seat may be considered surrendered without explicit input from the user, for instance if a location of the user is detected outside of the stadium (e.g., the user's client device 120 provides a location to the ticket exchange server 140 as the user walks away from the stadium), or if a user is located away from the seat for more than a threshold amount of time.

During a sporting event, the ticket module 210 detects vacant seats in the stadium 130. A vacant seat is a seat that is not assigned to a user for the sporting event, such as one that was surrendered or never assigned for the sporting event. The ticket module 210 receives seating information for a plurality of seats in the stadium 130 in real-time during the sporting event from the availability store 270. For each seat, seating information may include whether a seat is unlocked, locked, assigned to a user, surrendered by an assigned user, and/or unassigned. If the seat is or was assigned to a user, the seating information includes information describing the ticket the user had for the seat, such as the value of the ticket. The ticket module 210 may detect a vacant seat by monitoring the seating information for surrendered seats or by receiving an indication from a client device 120 that a user is surrendering their seat at the sporting event.

If the ticket module 210 detects a vacant seat in the stadium 130, the ticket module 210 accesses real-time statistics for the sporting event from the event store 240. The ticket module 210 inputs one or more of the real-time statistics to the vacancy model 280 to determine a value for the seat. The vacancy model 280 is a machine-learned model trained by the training module 220 to determine a likelihood that a seat will be vacant over the course of a sporting event. The vacancy model 280 may be a neural network, a classifier, a regression model, or any suitable machine-learned model. In additional or alternative embodiments, the ticket module 210 may input additional information to the vacancy model 280. The additional information may be a section of the stadium 130 the seat is in or one or more previous values paid for the seat at the current sporting event or previous sporting events, which may be obtained from the availability store 270 or the ticket store 260.

The vacancy model 280 returns an expected likelihood that the seat will be empty during the sporting event, which the ticket module 210 uses to determine a value of the seat. For instance, ticket module 210 may assign a seat with a low expected likelihood of being empty a higher value than a seat with a high expected likelihood of being empty. The ticket module 210 may use a tiered set of values based on the expected likelihood and a section of the seat to determine the value. The ticket module 210 sends the value to the user interface module 200 such that the user interface module 200 may offer a new ticket for the vacant seat at the value via the ordering interface. Alternatively, the user interface module 200 may offer a ticket for the section of the seat, rather than the seat itself, such that a user who purchases the new ticket is assigned the seat or another available seat in the section upon reaching the section. This distributing of the new ticket for a vacated seat is referred to as "double-distributing." The ticket module 210 may detect a vacant seat any number of times, such that a ticket for the same seat may be sold multiple times at the same sporting event, provided the seat has been surrendered multiple times. The ticket module 210 may store the value for the ticket in the ticket store 260 as ticket information and/or in the availability store 270 as seating information for the seat.

In some embodiments, the ticket module 210 monitors real-time statistics of an ongoing sporting event to determine if values of seats within the stadium are increasing based on the real-time statistics, which may act as a proxy for user demand. For example, if a baseball game started out with a rival team highly likely to win, but in the $6^{th}$ inning, the home team is winning, the ticket module 210 may determine that the value of the seats in the stadium 130 have increased. In other embodiments, tickets may be valued higher for close games than for blowouts, for games consequential to playoff likelihoods than otherwise, for games with rival teams than games with non-rival teams, and the like. The ticket module 210 may analyze the real-time statistics by inputting the real-time statistics to a machine-learned model configured to determine values of seats based on real-time statistics, a number of users leaving the sporting event, and other event information about a sporting event. If the ticket module 210 determines that seats at the sporting event could be resold for values over a threshold amount, the ticket module 210 may send an indication to the user interface module 200 to offer rebates to users at the sporting event who surrender their assigned seats. The ticket module may use a tiered system for determining values of the rebates based on the values of the seats or may use a standard value for each rebate.

The training module 220 trains one or more machine-learned models employed by the ticket exchange system 140. In particular, the training module 220 trains the attendance model 250. The training module 220 retrieves attendance training data stored in the training store 290. The attendance training data includes historical attendance data for historical sporting events held at the stadium 130, historical opponents of a home sports team during the sporting events at the stadium 130, and historical win/loss records of the home sports team. Historical sporting events are those that have occurred in the past. The training module 220 labels the historical sporting events with the attendance training data and inputs the labeled sporting events into the attendance model 250 to train the attendance model 250 to predict attendance at a future sporting event. The training module 220 may store the labeled sporting events in the training store 290 to use for future model training.

The training module 220 also trains the vacancy model 280. The training module 220 retrieves vacancy training data from the training store 290. The vacancy training data describes, for each of a plurality of historical sporting events, attendance over the course of the historical sporting event and statistics of the historical sporting event. The vacancy training data my further include seating information in some instances. The training module 220 labels, for each of the plurality of historical sporting events, each seat at the stadium 130 of the historical sporting event based on the attendance training data and inputs the labeled seats into the attendance model 250 to train the vacancy model 280 to predict an expected likelihood that a seat is empty or will become empty over the course of a sporting event. The training module 220 may store the labeled seats in the training store 290 to use for future model training.

Figure 3:
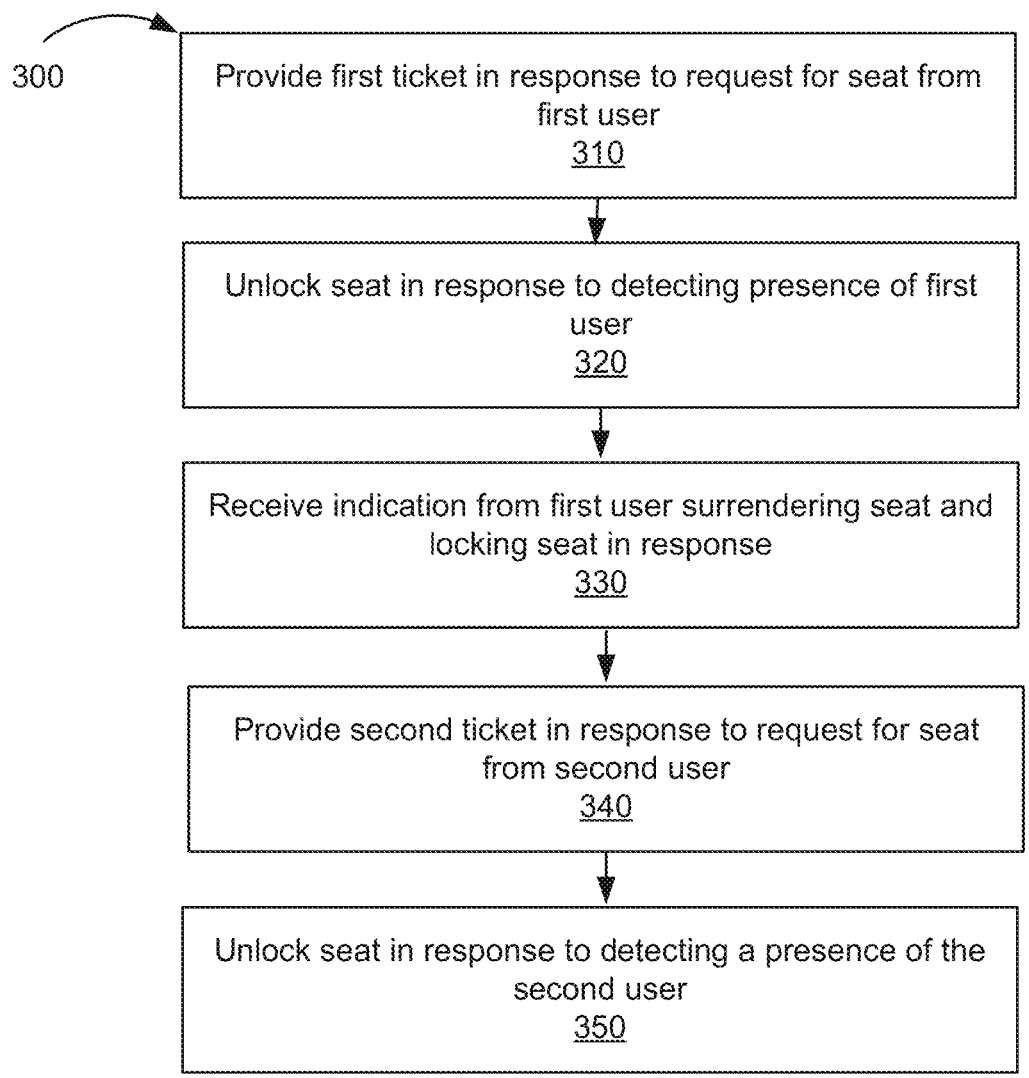
FIG. 3 is a flowchart illustrating a process for distributing a ticket for a vacated seat at an event, according to one embodiment.

FIG. 3 is a flowchart illustrating a process 300 for double-distributing a ticket for a vacated seat at a sporting event, according to one embodiment. Though reference is made to the ticket exchange server 140 for this process 300, the process can be used by other online systems or mobile applications for double-distributing seats at other events.

The user interface module 200 provides 310 a first ticket to a first client device 120A of a first user in response to receiving a first request from the seat from the first client device 120A. The ticket module 210 may provide the first ticket in response to charging the first user for the first ticket. In response to detecting a presence of the first user at the seat via the first client device 120A, the ticket module 210 unlocks 320 the seat for the first user. The user interface module 200 receives 330 an indication from first client device surrendering the seat prior to a completion of the sporting event and, in response, the ticket module 210 locks the seat. In response to receiving a second request for the seat from a second client device 120B associated with a second user, the user interface module 200 provides 340 a second ticket for the seat for a remainder of the sporting event to the second client device 120B. The ticket module 210 may provide the second ticket in response to charging the second user for the second ticket. The ticket module 210 unlocks 350 the seat in response to detecting, via the second client device 120B, a presence of the second user at the seat.

It is appreciated that although FIG. 3 illustrates a number of interactions according to one embodiment, the precise interactions and/or order of interactions may vary in different embodiments. For example, in some embodiments, the first ticket may specify a first section of the stadium, and in response to detecting that the first mobile device is located at the first section, the ticket module 210 determines seat availability in the first section from seating information stored in the availability store 270. The ticket module 210 assigns the seat in the first section to the first user based on ticket availability indicating that the seat is the best (e.g., closest to the front of the first section) available seat in the first section. In further embodiments, the ticket module 210 may select the best available seat subject to keeping a group of users, including the first user, with tickets for the first section together in the stadium 130.

The process 300 may also include the ticket module 210 upgrading users when a section of the stadium 130 is full. In particular, the ticket module 210 may assign, in response to the seat availability indicating that the first section is full, the seat to the first user in a second section of the stadium. In this instance, the second section has seats with higher values than the first section. The process 300 may also include the ticket module 210 assigning tickets for a group of users. For instance, when the first ticket specifies a first section in the stadium 130, the ticket module 210 access group data that describes a group of tickets in the first section including the first ticket and a plurality of client devices 120 of a plurality of users associated with the tickets. In response to detecting that a client device 120 of the plurality of client devices 120 is located at the first section, the ticket module 210 determines seat availability in the first section and assigns seats positioned together within the first section to each user of the plurality of users based on the seat availability.

Figure 4:
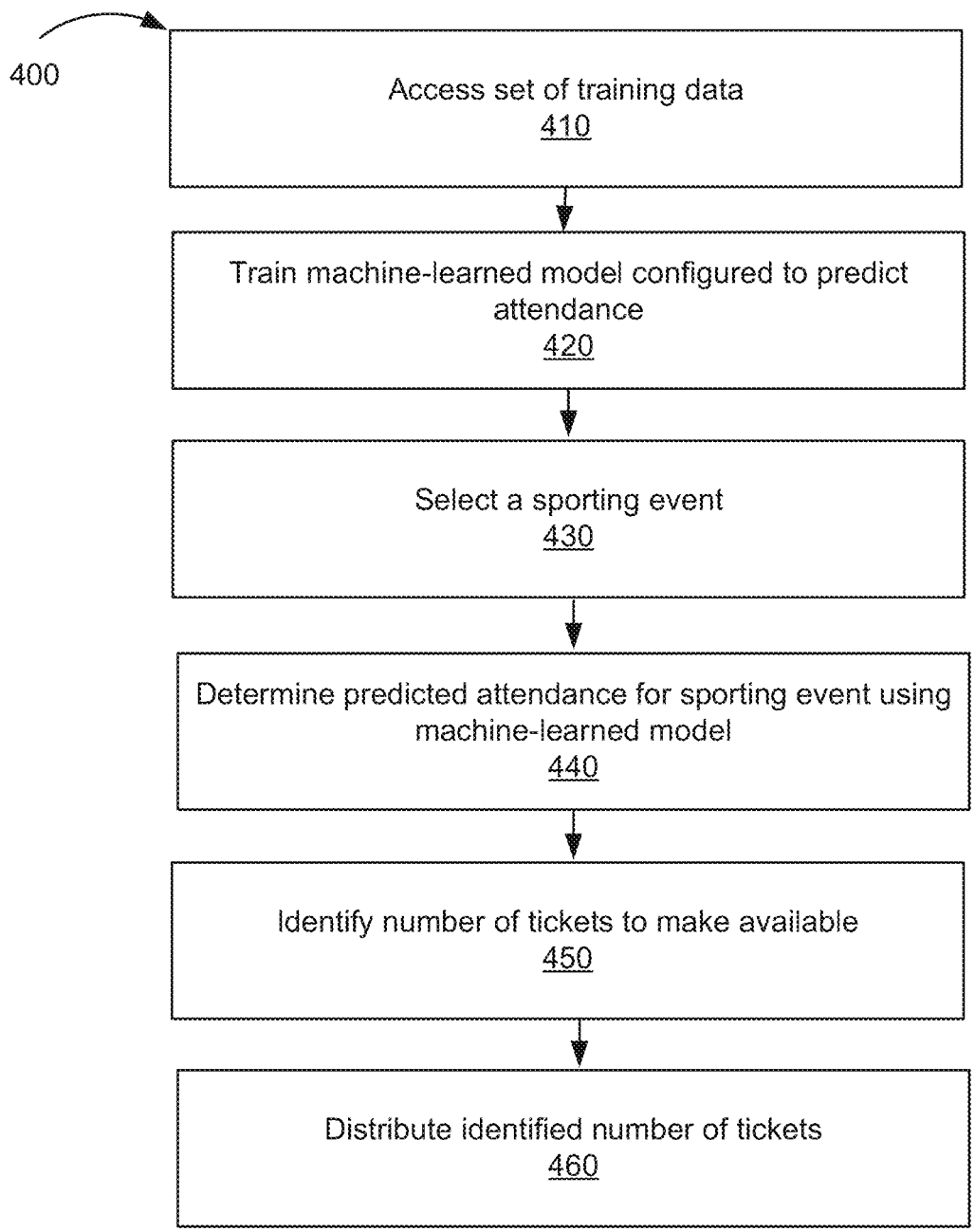
FIG. 4 is a flowchart illustrating a process for distributing tickets to an event based on a predicted attendance, according to one embodiment.

FIG. 4 is a flowchart illustrating a process 400 for distributing tickets to a sporting event based on a predicted attendance, according to one embodiment. Though reference is made to the ticket exchange server 140 for this process 300, the process can be used by other online systems or mobile applications for predict attendance at another event.

The training module 220 accesses 410 a set of training data for a stadium 130 associated with a sports team. The training data describes historical attendance data for historical sporting events previously held the stadium, historical opponents of the sporting team during the historical sporting events, and historical win/loss records of the sports team. The training module 220 trains 420 a machine-learned model, such as the attendance model 250, configured to predict attendance for a future sporting event at the stadium based at least in part on a future opponent of the sports team at the sporting event and a current or predicted win/loss record for the sports team. The ticket module 210 selects 430 a sporting event for the sports team against an opponent. The ticket module 210 may select a future sporting event that will occur in a threshold amount of time or based on receiving an indication form an administrator to determine a number of tickets for the sporting event. The ticket module 210 determines 440 a predicted attendance for the sporting event using the machine-learned model based at least in part on the opponent and a current or predicted win/loss record for the sports team. The ticket module 210 identifies 450 a number of tickets greater than a capacity of the stadium to make available for the event based on the predicted attendance, and the user interface module 200 distributes 460 up to the identified number of tickets to prospective attendees of the sporting event.

In other embodiments, the same process 400 may be used for other events. For example, other events may include concerts, movies, shows, and conferences. In these embodiments, the training data used to train the machine-learned model may describe historical attendance for other events held at the stadium, historical promotions of the other events, and historical attendance of similar events at other similar stadiums. Similar stadiums may be located within a threshold distance from the stadium 130, be located in a similar demographic area, have a comparable capacity to the stadium, or host similar types of events to the stadium 130. For example, a similar stadium to a baseball stadium 130 in New York City that holds 2,000 people would be a baseball stadium in Chicago that holds 2,500 people.

It is appreciated that although FIG. 4 illustrates a number of interactions according to one embodiment, the precise interactions and/or order of interactions may vary in different embodiments. For example, the user interface module 200 may send incentives to users to release tickets for the sporting event responsive to the ticket module 210 determining that more users than available seats have arrived at the sporting event. In another example, the ticket module 210 may determine the predicted attendance to be greater if a sport team playing at the sporting event has a winning win/loss record rather than if the sports team has a losing win/loss record. Additionally, the ticket module 210 may determine that the predicted attendance is greater if an opponent of the sports team is a divisional or local rival of the sports team than if the opponent is not.

Figure 5:
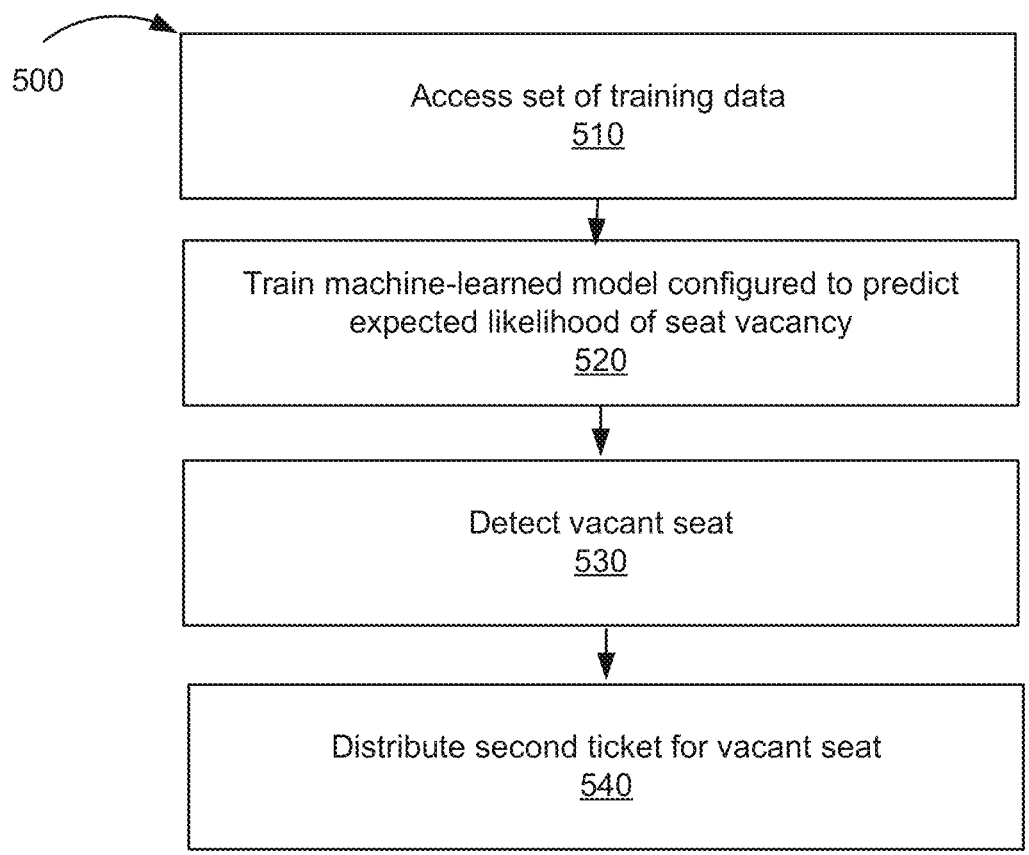
FIG. 5 is a flowchart illustrating a process for distributing a ticket for a vacant seat, according to one embodiment.

FIG. 5 is a flowchart illustrating a process 500 for distributing a ticket for a vacant seat, according to one embodiment. Though reference is made to the ticket exchange server 140 for this process 300, the process can be used by other online systems or mobile applications for detecting vacant seats at another event.

The training module 220 accesses 510 a set of training data for a stadium 130. The training data describes, for each of a plurality of historical sporting events at the stadium, attendance over the course of the historical sporting event and statistics associated with the historical sporting event. The training module 220 trains 520 a machine-learned model, such as the vacancy model 280, on the training data. The machine-learned model is configured to predict an expected likelihood of a seat within the stadium will be vacant over the course of a future sporting event based on real-time statistics associated with the future sporting event. The ticket module 210 detects 530 a vacant seat within the stadium during a sporting event, where the vacant seat is associated with a first ticket for the sporting event distributed to a first user. The user interface module 200 distributes 540 a second ticket for the vacant seat for a portion of the sporting event to a second user. The ticket module 210 determines a value of the second ticket based at least in part by applying the machine-learned model to real-time statistics of the sporting event. The ticket module 210 may determine that the value of the second ticket is greater if a difference between a score at the sporting event and a baseline score is below a threshold difference than if the difference is above-threshold difference.

It is appreciated that although FIG. 5 illustrates a number of interactions according to one embodiment, the precise interactions and/or order of interactions may vary in different embodiments. For example, the ticket module 210 may access a previous value paid by the second user for a previous seat at the sporting event prior to detecting the vacant seat and send, to the user interface module 200, a value to charge the second user based on the previous value and the determined value. For instance, the ticket module may determine the value to charge to be a difference between the previous value and the determined value. In another example, the ticket module 210 may determine the value of the second ticket for the vacant seat before the first user has vacated the seat by applying the machine-learned model. If the value exceeds a threshold, the user interface module 200 may send an incentive to a client device 120 of the first user to vacate the seat and offer the second ticket for the value via the ordering interface in response to receiving an indication from the first user's client device indicating that the first user has surrendered the seat.

Figure 6A:
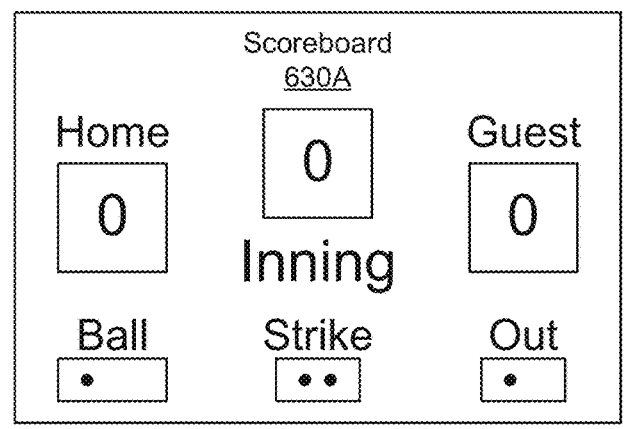
FIG. 6A illustrates a first user at a baseball game, according to one embodiment.
Figure 6A:
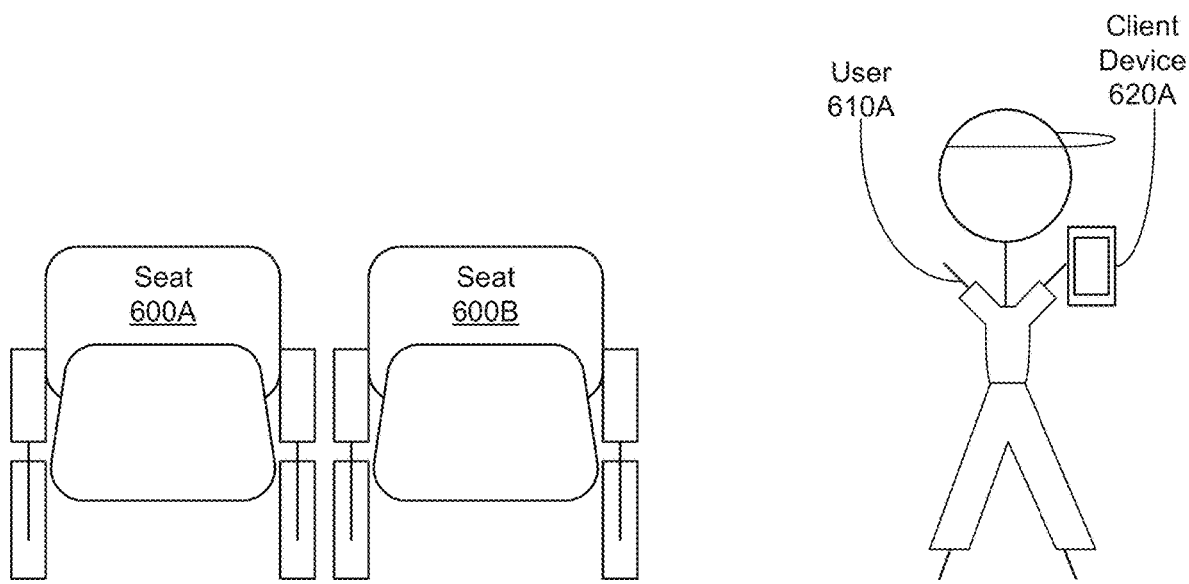
Figure 6B:
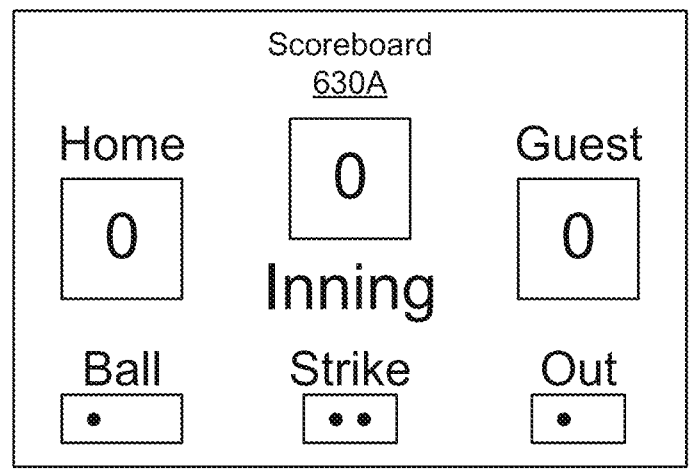
FIG. 6B illustrates a first user at an unlocked seat, according to one embodiment.
Figure 6B:
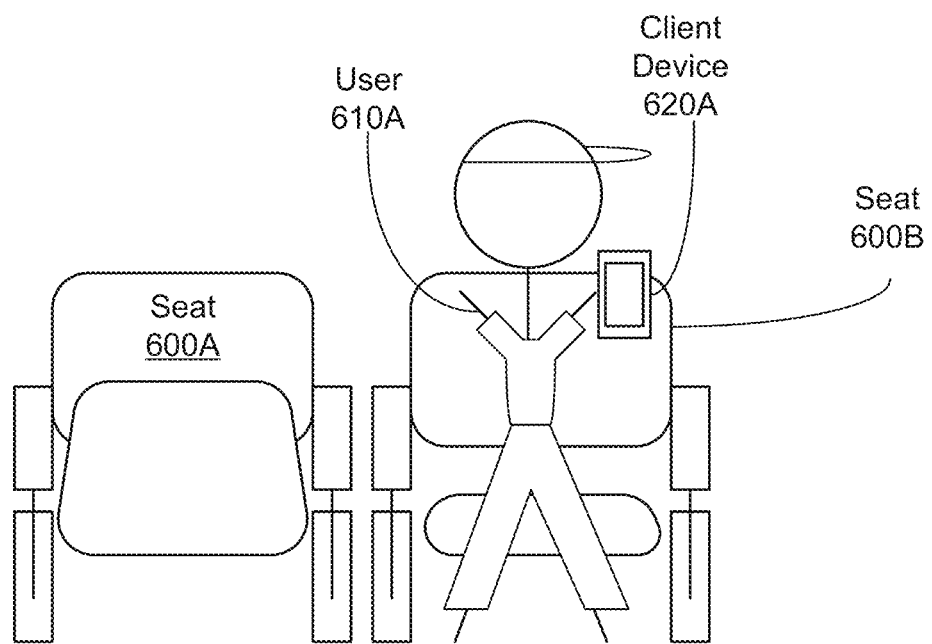

FIGS. 6A-6E illustrates a first user 610A at a baseball game, according to one embodiment. In FIG. 6A, the first user 610A at a baseball game is moving towards a set of locked seats 600 in a baseball stadium 130. The first user 610A is carrying a client device 620A, which the ticket module 210 is communicating with to monitor the first user's 610A location in the baseball stadium 130. As shown on the scoreboard 630A, the baseball game has recently started. In FIG. 6B, the first user 610A has reached their seat 600B, so the ticket module 210 unlocked the seat 600B responsive to detecting the first user's 610A presence at the seat 600B. However, the ticket module 210 did not unlock seat 600A since the attendee's ticket was only for seat 600B.

Figure 6C:
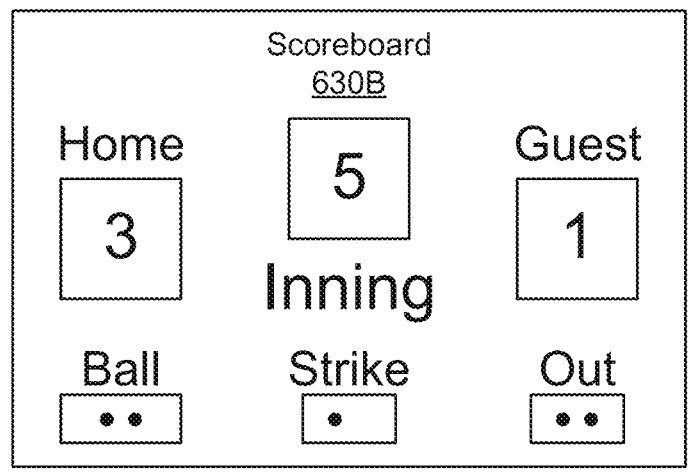
FIG. 6C illustrates a relocked seat vacated by the first user at the baseball game, according to one embodiment.
Figure 6C:
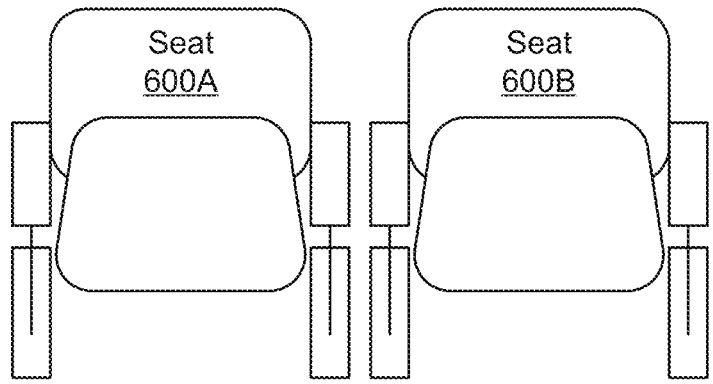
Figure 6D:
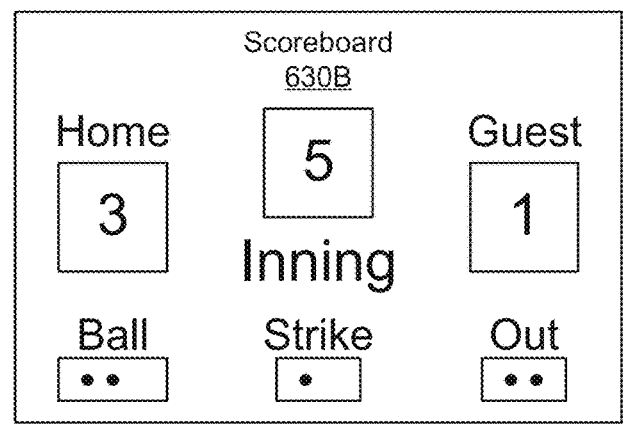
FIG. 6D illustrates a second user at the baseball game, according to one embodiment.
Figure 6D:
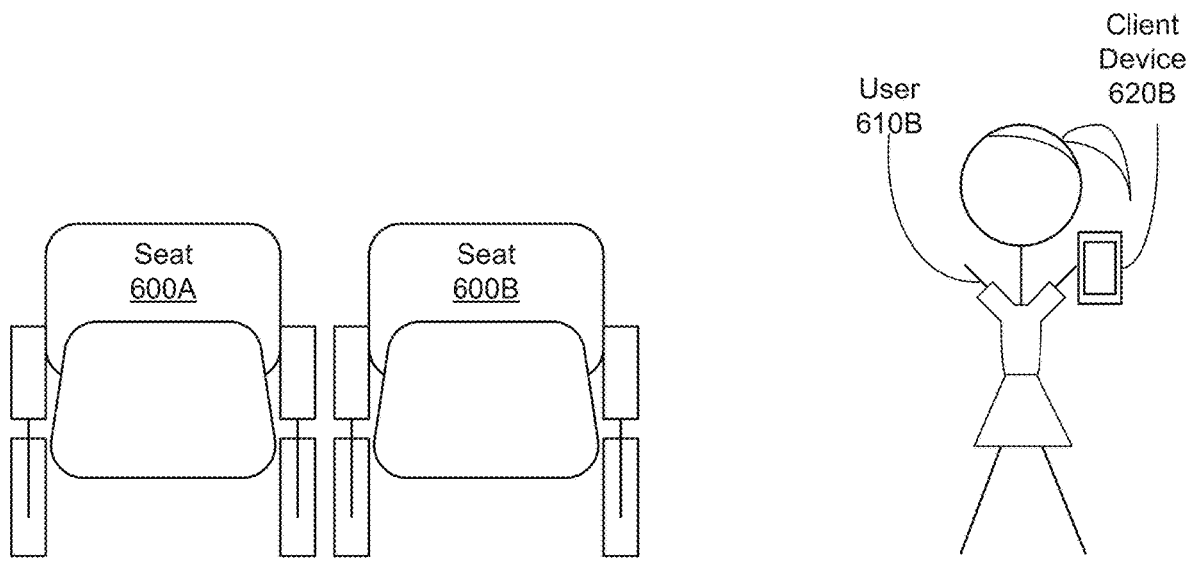
Figure 6E:
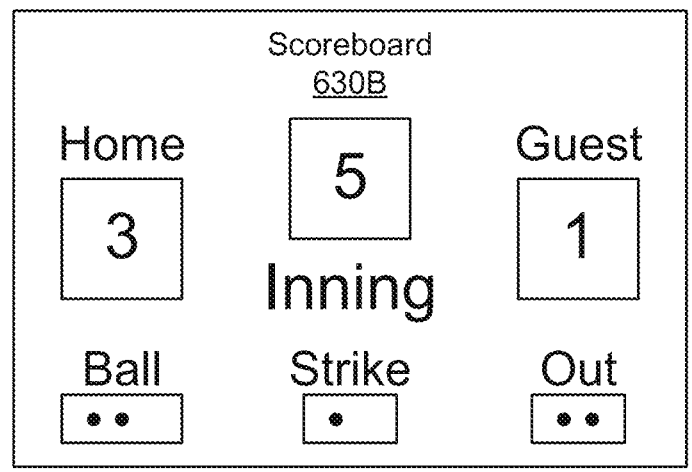
FIG. 6E illustrates a second user at the unlocked seat, according to one embodiment.
Figure 6E:
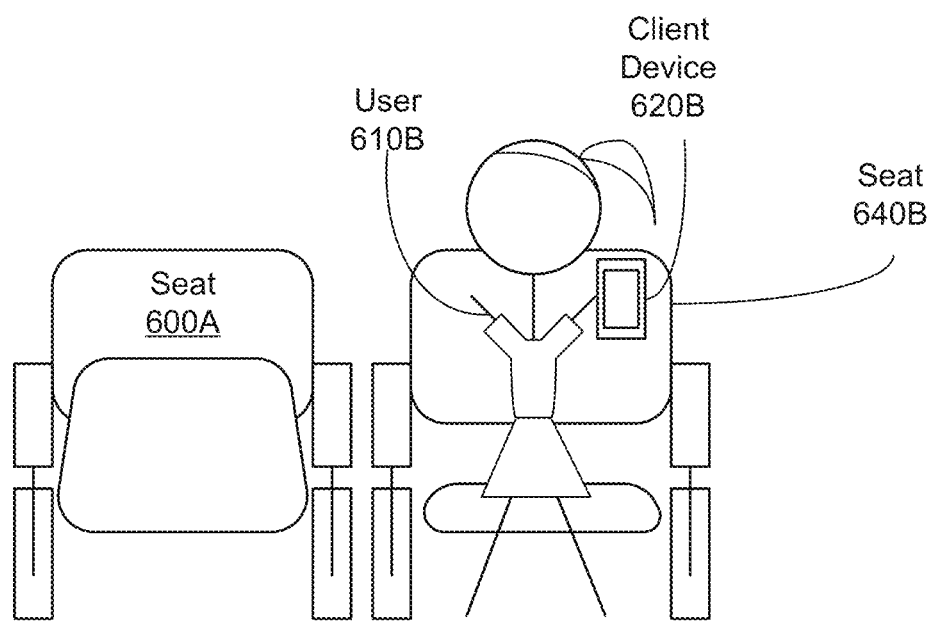

In FIG. 6C, the first user 610A has left the baseball game before its conclusion, as shown by the scoreboard 630B, and surrendered seat 600B via their client device 620A. In response, the ticket module 210 locked the seat 600B. The user interface module 200 distributed a new ticket for the seat 600B to a second user 610B, who is moving towards the seat 600B in FIG. 6D, before the baseball game has ended. The ticket exchange server 140 unlocks the seat 600B in response to detecting a presence of the second user 610B at the seat 600B via their client device 620B, as shown in FIG. 6E.

Figure 7:
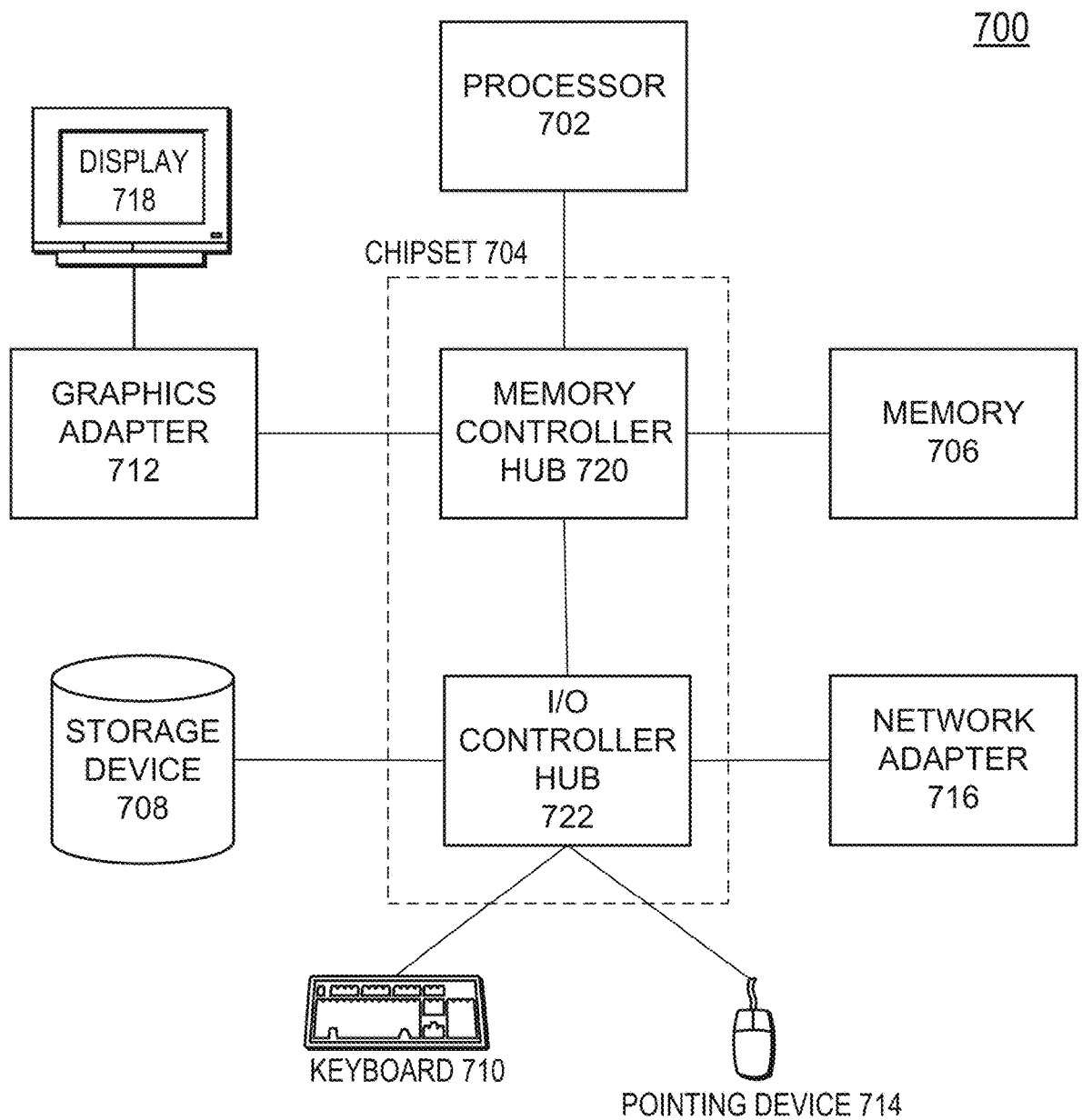
FIG. 7 is a high-level block diagram illustrating physical components of a computer, according to one embodiment.

FIG. 7 is a high-level block diagram illustrating physical components of a computer, according to one embodiment. Illustrated are at least one processor 702 coupled to a chipset 704. Also coupled to the chipset 704 are a memory 706, a storage device 708, a graphics adapter 712, and a network adapter 716. A display 718 is coupled to the graphics adapter 712. In one embodiment, the functionality of the chipset 404 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700 acting as a server may lack a graphics adapter 712, and/or display 718, as well as a keyboard or pointing device. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention, which is set forth in the following claims.

What is claimed is:

1. A computer-implemented method comprising:
    accessing, for a stadium associated with a sports team, a set of training data describing historical attendance data for sporting events at the stadium, describing historical opponents of the sports team during the sporting events, and describing historical win/loss records for the sports team;
    training, using the set of training data, a machine-learned model configured to predict an attendance for a future sporting event at the stadium based at least in part on a future opponent of the sports team at the future sporting event and a current or predicted win/loss record for the sports team;
    selecting, by a ticket exchange server, a future sporting event for the sports team against an opponent, wherein the selected future sporting event is scheduled to occur at a future time;
    inputting event information for the selected future sporting event to the machine-learned model, the event information comprising the opponent and a current or predicted win/loss record for the sports team;
    receiving, from the machine-learned model, a predicted attendance for the selected future sporting event;
    identifying a number of tickets greater than a capacity of the stadium to make available for the selected future sporting event based on the predicted attendance;
    distributing, via the ticket exchange server, up to the identified number of tickets to prospective attendees of the selected future sporting event, the distributed tickets identifying a section of the stadium but not identifying a specific seat within the stadium; and
    in response to receiving a location of a mobile device including a distributed ticket captured by a GPS receiver of the mobile device indicating that the mobile device is located at the section identified by the distributed ticket within the stadium, assigning, via the ticket exchange server, a seat within the section to the distributed ticket, and detecting a near-field signal transmitted by the mobile device identifying the distributed ticket to the seat within the section to physically unlock the seat.

2. The computer-implemented method of claim 1, wherein the event information further comprises calendar data including one or more of a day of the week of the selected future sporting event, a time of the selected future sporting event, and a schedule of games for the sports team.

3. The computer-implemented method of claim 1, wherein the machine-learned model predicts an attendance for each section of the stadium, the method further comprising:
    identifying, for each section of the stadium, a number of tickets greater than a capacity of the section to make available based on the predicted attendance for the section.

4. The computer-implemented method of claim 1, further comprising:
    in response to more attendees arriving than available seats at the selected future sporting event, sending, to one or more client devices associated with attendees, incentives to release tickets for the selected future sporting event.

5. The computer-implemented method of claim 1, wherein each ticket specifies a section of the stadium, the method further comprising:
in response to detecting, via a client device of an attendee with a ticket, a presence of the attendee at the stadium, sending, to the client device, a seat assignment in the section associated the ticket.

6. The computer-implemented method of claim 1, wherein the predicted attendance for the selected future sporting event is greater if the sports team has a winning record than a losing record.

7. The computer-implemented method of claim 1, wherein the predicted attendance for the selected future sporting event is greater if an opponent is a divisional or local rival of the sports team than if the opponent is not a divisional or local rival of the sports team.

8. The computer-implemented method of claim 1, wherein the identified number of tickets is greater for a first predicted attendance than for a second predicted attendance greater than the first predicted attendance.

9. The computer-implemented method of claim 1, wherein the selected future sporting event is one of a basketball game, a baseball game, a football game, a volleyball game, a soccer game, a tennis match, a hockey game, and a rugby game.

10. A non-transitory computer-readable storage medium comprising instructions executable by a processor, the instructions comprising:
instructions for accessing, for a stadium associated with a sports team, a set of training data describing historical attendance data for sporting events at the stadium, describing historical opponents of the sports team during the sporting events, and describing historical win/loss records for the sports team;
instructions for training, using the set of training data, a machine-learned model configured to predict an attendance for a future sporting event at the stadium based at least in part on a future opponent of the sports team at the future sporting event and a current or predicted win/loss record for the sports team;
instructions for selecting, by a ticket exchange server, a future sporting event for the sports team against an opponent, wherein the selected future sporting event is scheduled to occur at a future time;
instructions for inputting event information for the selected future sporting event to the machine-learned model, the event information comprising the opponent and a current or predicted win/loss record for the sports team;
instructions for receiving, from the machine-learned model, a predicted attendance for the selected future sporting event;
instructions for identifying a number of tickets greater than a capacity of the stadium to make available for the selected future sporting event based on the predicted attendance;
instructions for distributing, via the ticket exchange server, up to the identified number of tickets to prospective attendees of the sporting event, the distributed tickets identifying a section of the stadium but not identifying a specific seat within the stadium; and
instructions for, in response to receiving a location of a mobile device including a distributed ticket captured by a GPS receiver of the mobile device indicating that the mobile device is located at the section identified by the distributed ticket within the stadium, assigning, via the ticket exchange server, a seat within the section to the distributed ticket, and detecting a near-field signal transmitted by the mobile device identifying the distributed ticket to the seat within the section to physically unlock the seat.

11. The non-transitory computer-readable storage medium of claim 10, wherein the event information further comprises calendar data including one or more of a day of the week of the selected future sporting event, a time of the selected future sporting event, and a schedule of games for the sports team.

12. The non-transitory computer-readable storage medium of claim 11, wherein the machine-learned model predicts an attendance for each section of the stadium, the instructions further comprising:
instructions for identifying, for each section of the stadium, a number of tickets greater than a capacity of the section to make available based on the predicted attendance for the section.

13. The non-transitory computer-readable storage medium of claim 12, the instructions further comprising:
in response to more attendees arriving than available seats at the selected future sporting event, instructions for sending, to one or more client devices associated with attendees, incentives to release tickets for the selected future sporting event.

14. The non-transitory computer-readable storage medium of claim 11, wherein each ticket specifies a section of the stadium, the instructions further comprising:
in response to detecting, via a client device of an attendee with a ticket, a presence of the attendee at the stadium, instructions for sending, to the client device, a seat assignment in the section associated the ticket.

15. The non-transitory computer-readable storage medium of claim 10, wherein the predicted attendance for the selected future sporting event is greater if the sports team has a winning record than a losing record.

16. The non-transitory computer-readable storage medium of claim 10, wherein the predicted attendance for the selected future sporting event is greater if an opponent is a divisional or local rival of the sports team than if the opponent is not a divisional or local rival of the sports team.

17. The non-transitory computer-readable storage medium of claim 10, wherein the identified number of tickets is greater for a first predicted attendance than for a second predicted attendance greater than the first predicted attendance.

18. The non-transitory computer-readable storage medium of claim 10, wherein the selected future sporting event is one of a basketball game, a baseball game, a football game, a volleyball game, a soccer game, a tennis match, a hockey game, and a rugby game.

19. A computer system comprising:
a computer processor; and
a non-transitory computer-readable storage medium storage instructions that when executed by the computer processor perform actions comprising:
accessing, for a stadium associated with a sports team, a set of training data describing historical attendance data for sporting events at the stadium, describing historical opponents of the sports team during the sporting events, and describing historical win/loss records for the sports team;
training, using the set of training data, a machine-learned model configured to predict an attendance for a future sporting event at the stadium based at least in part on a future opponent of the sports team at the future sporting event and a current or predicted win/loss record for the sports team;

selecting, by a ticket exchange server, a future sporting event for the sports team against an opponent, wherein the selected future sporting event is scheduled to occur at a future time;

inputting event information for the selected future sporting event to the machine-learned model, the event information comprising the opponent and a current or predicted win/loss record for the sports team;

receiving, from the machine-learned model, a predicted attendance for the selected future sporting event;

identifying a number of tickets greater than a capacity of the stadium to make available for the selected future sporting event based on the predicted attendance;

distributing, via the ticket exchange server, up to the identified number of tickets to prospective attendees of the sporting event, the distributed tickets identifying a section of the stadium but not identifying a specific seat within the stadium; and in response to receiving a location of a mobile device including a distributed ticket captured by a GPS receiver of the mobile device indicating that the mobile device is located at the section identified by the distributed ticket within the stadium, assigning, via the ticket exchange server, a seat within the section to the distributed ticket, and detecting a near-field signal transmitted by the mobile device identifying the distributed ticket to the seat within the section to physically unlock the seat.

20. The computer system of claim 19, wherein the event information further comprises calendar data including one or more of a day of the week of the selected future sporting event, a time of the selected future sporting event, and a schedule of games for the sports team.

* * * * *